(12) United States Patent
Miller, Jr. et al.

(10) Patent No.: US 8,444,174 B1
(45) Date of Patent: May 21, 2013

(54) COLLAPSIBLE DEER BLIND

(76) Inventors: Gilbert Miller, Jr., Bremen, IN (US);
Ronald E. Ameling, Bremen, IN (US)

(*) Notice: Subject to any disclaimer, the term of this patent is extended or adjusted under 35 U.S.C. 154(b) by 0 days.

(21) Appl. No.: 13/423,187

(22) Filed: Mar. 17, 2012

Related U.S. Application Data

(60) Provisional application No. 61/453,888, filed on Mar. 17, 2011.

(51) Int. Cl.
*B62B 7/00* (2006.01)
*E04C 1/00* (2006.01)

(52) U.S. Cl.
USPC ..................... 280/656; 280/657; 182/63.1

(58) Field of Classification Search
USPC ............... 280/656; 52/169.12, 69, 70, 143, 52/794.1; 113/102, 116, 901; 296/35.1, 168, 296/180, 61; 160/351; 217/46, 47
See application file for complete search history.

(56) References Cited

U.S. PATENT DOCUMENTS

| | | | | |
|---|---|---|---|---|
| 3,352,313 A | * | 11/1967 | Kroening | 280/19.1 |
| 3,826,270 A | * | 7/1974 | Hentges | 280/19.1 |
| 3,971,395 A | * | 7/1976 | Lipinski | 280/19.1 |
| 4,067,247 A | * | 1/1978 | Niemann et al. | 74/499 |
| 4,631,877 A | | 12/1986 | Molodecki | |
| 5,033,493 A | * | 7/1991 | Senchuck | 135/149 |
| 5,295,555 A | * | 3/1994 | Strange | 182/2.5 |
| 5,333,421 A | * | 8/1994 | McKenna | 52/86 |
| 6,016,823 A | * | 1/2000 | Hill | 135/124 |
| 6,290,023 B1 | * | 9/2001 | Martin | 182/127 |
| 6,945,743 B2 | * | 9/2005 | Sherman et al. | 414/476 |
| 6,948,280 B2 | | 9/2005 | Marcinkowski et al. | |
| 7,255,526 B2 | | 8/2007 | Friesenhahn, Sr. et al. | |
| 7,735,167 B2 | * | 6/2010 | Kline et al. | 5/414 |
| 7,743,781 B2 | | 6/2010 | Slaughter | |
| 7,905,242 B2 | * | 3/2011 | Kline | 135/96 |
| 8,151,934 B2 | * | 4/2012 | Kirby | 182/63.1 |
| 2007/0045046 A1 | | 3/2007 | Hayes | |

* cited by examiner

*Primary Examiner* — John Walters
*Assistant Examiner* — James Triggs
(74) *Attorney, Agent, or Firm* — QuickPatents; Kevin Prince

(57) ABSTRACT

A hunting blind is disclosed for use with a utility trailer that includes a rectangular base, each side thereof having a different relative height than the others. The base is adapted for removable attachment with the frame of the utility trailer. Four walls are fixed with the base each with at least one hinge and are selectively fixed together in a deployed position. A roof may be included and fixable with a top edge of at least two of the walls. The walls may be folded down over the trailer in turn to achieve a collapsed configuration suitable for towing. The trailer frame may include both a vehicle platform fixed above the walls when collapsed for transporting an ATV, and a game platform for holding caught game thereon.

22 Claims, 6 Drawing Sheets

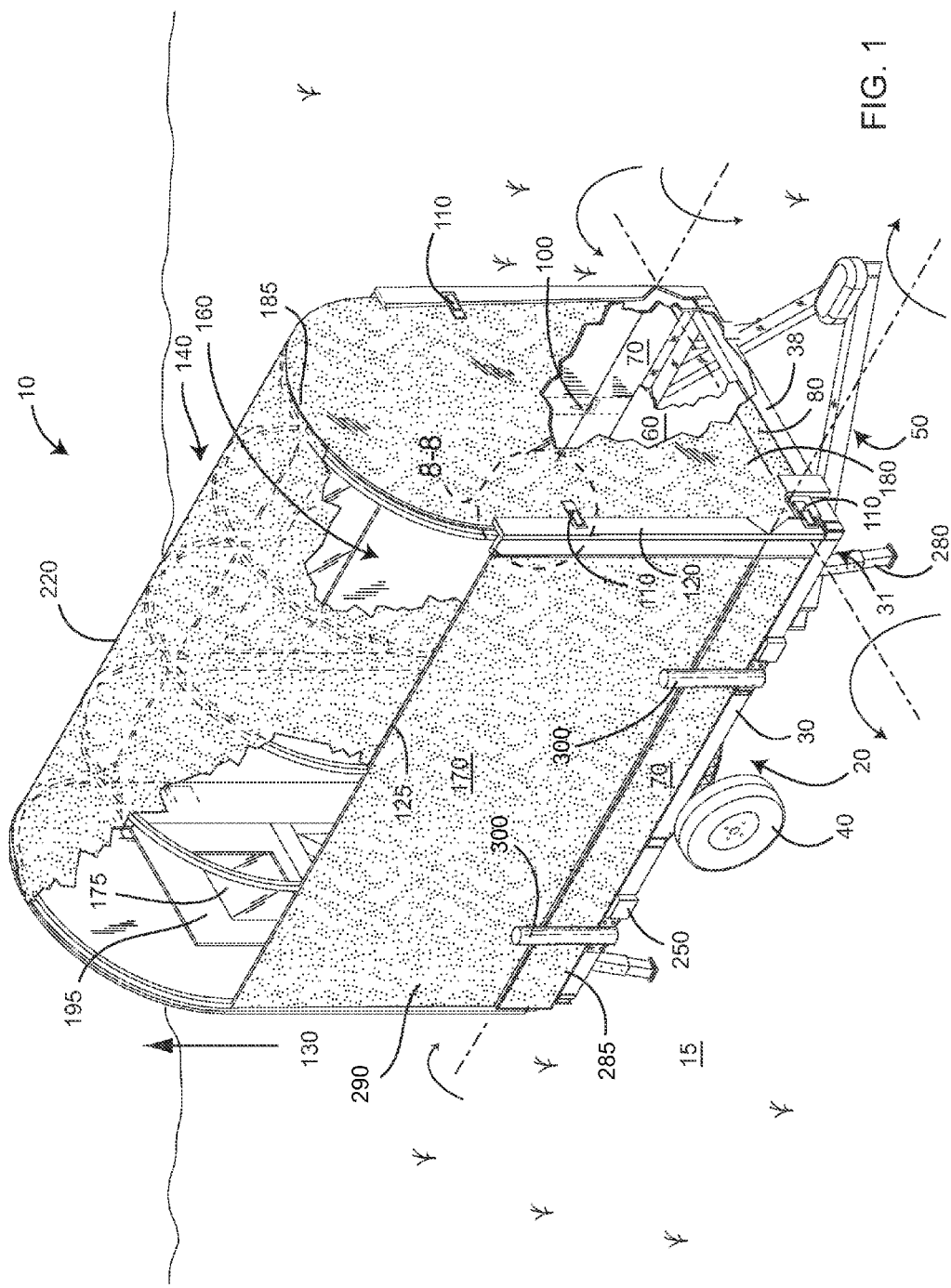

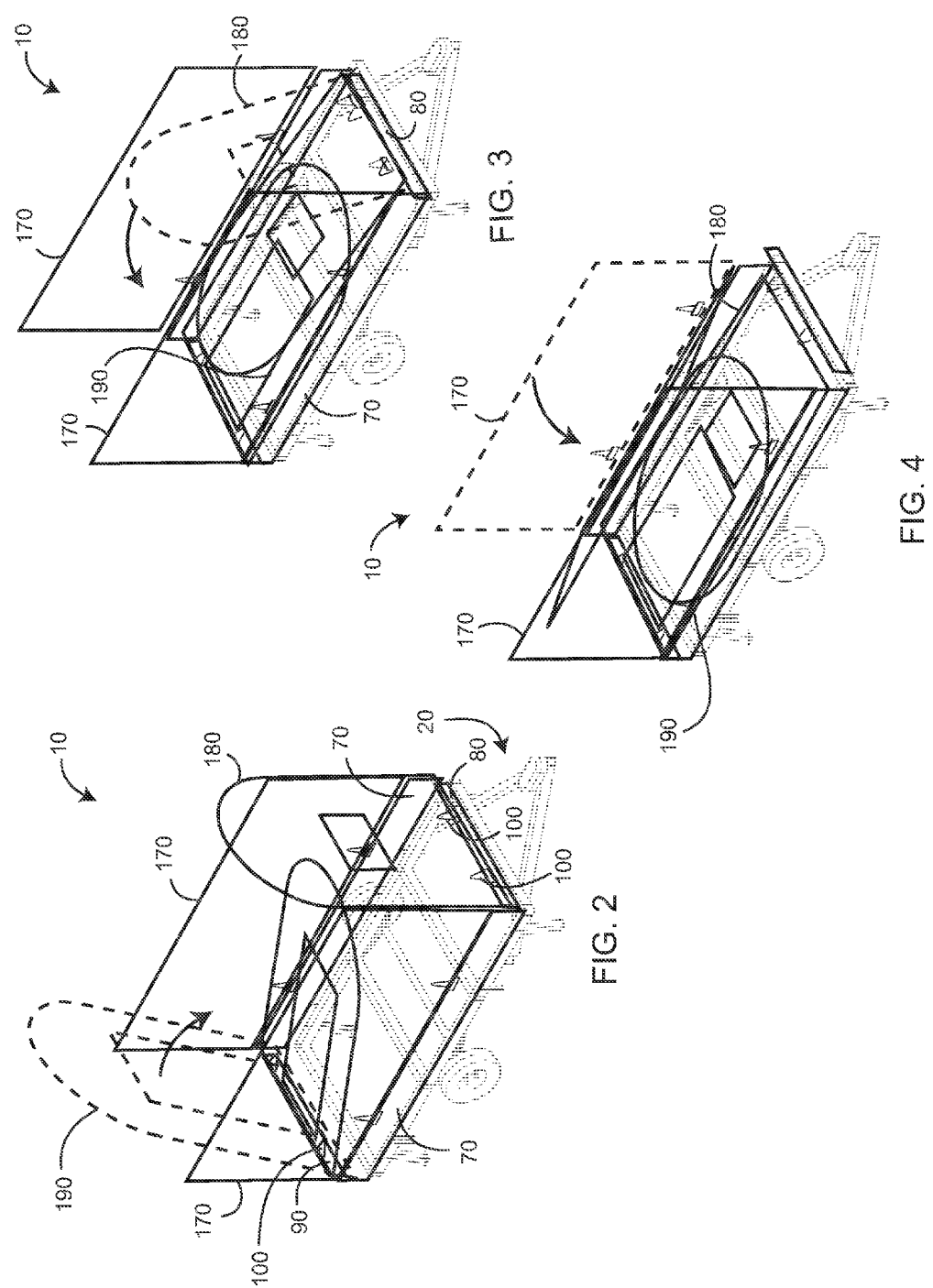

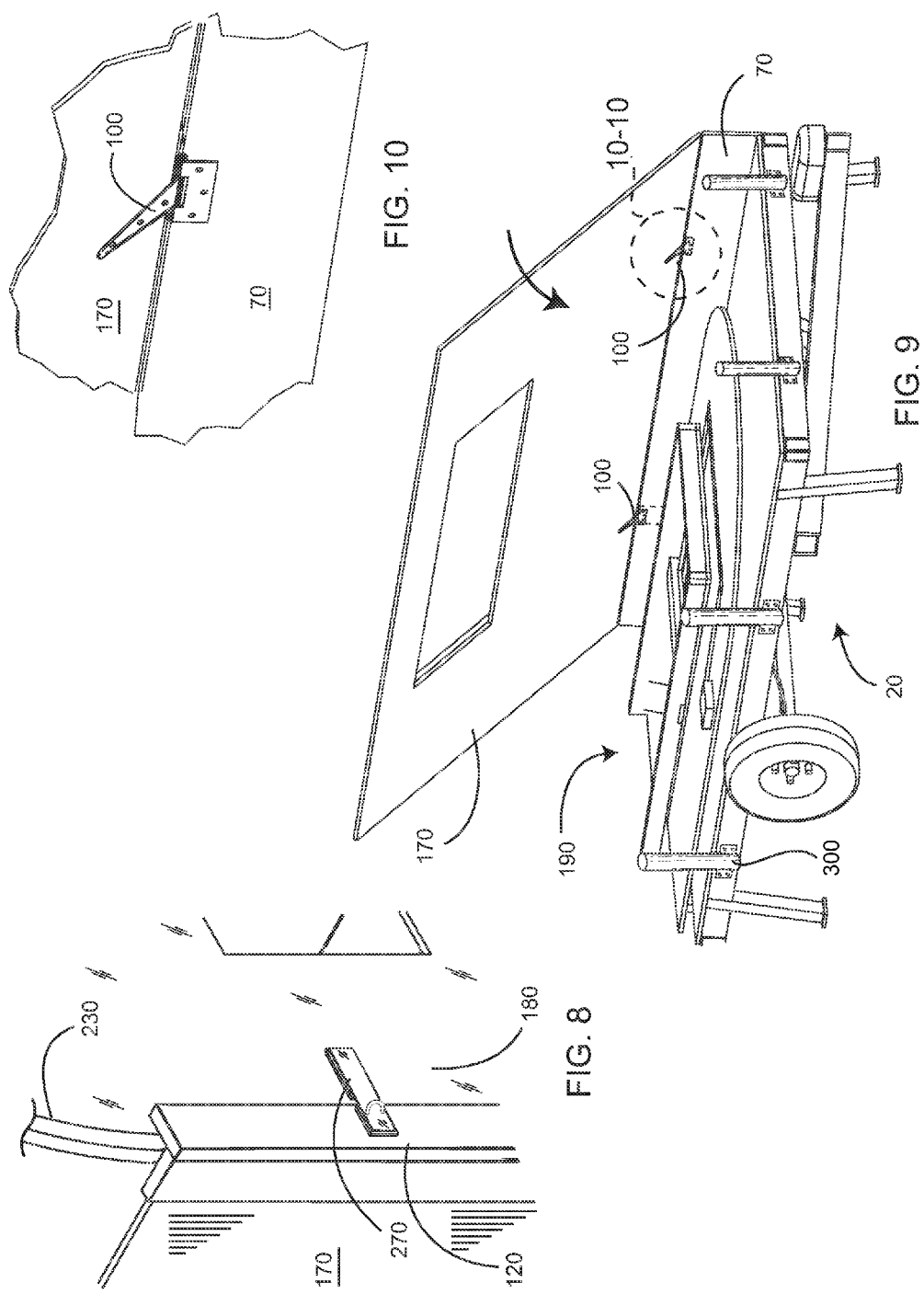

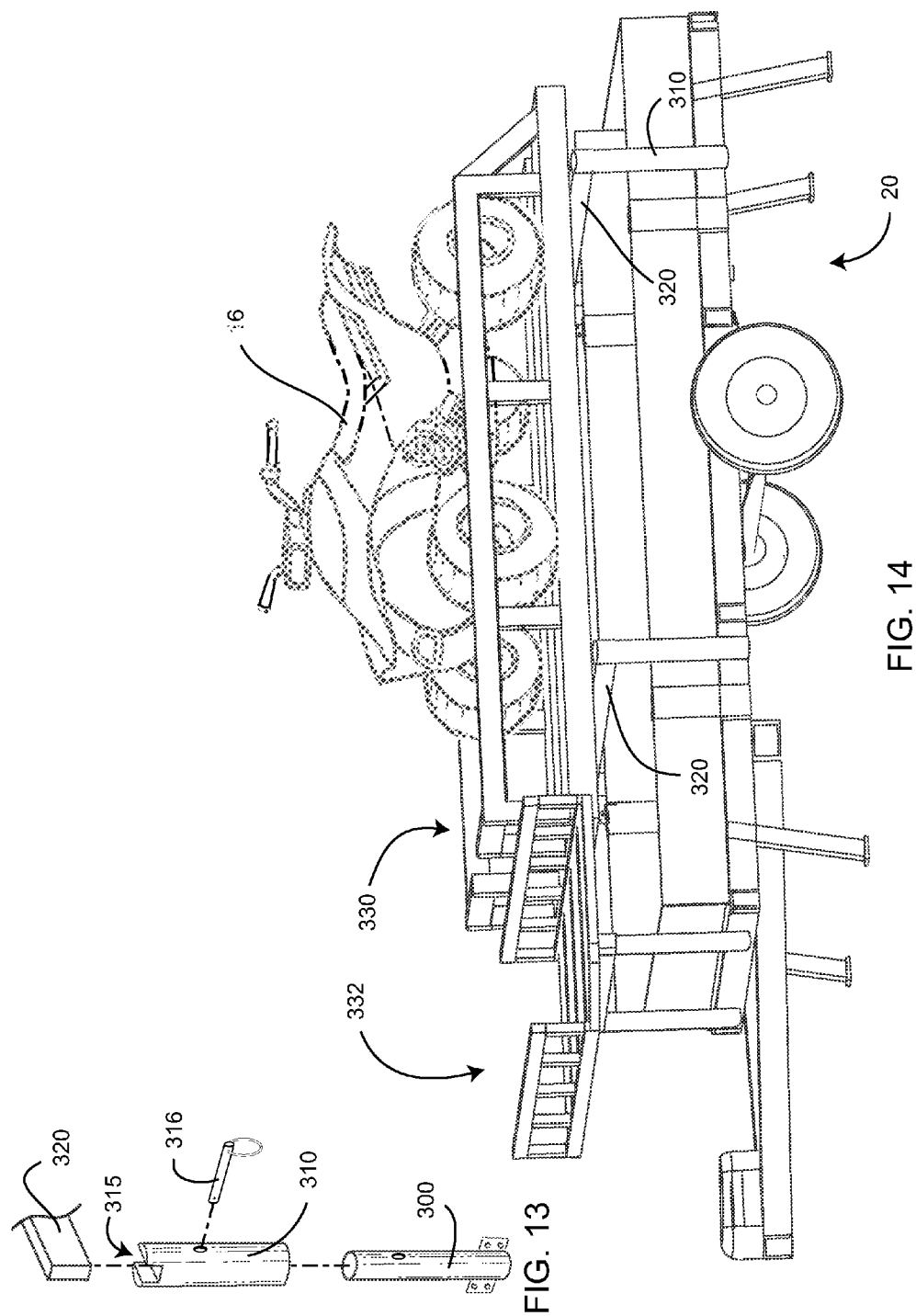

COLLAPSIBLE DEER BLIND

CROSS-REFERENCE TO RELATED APPLICATIONS

This application claims the benefit of U.S. Provisional Patent Application 61/453,888, filed on Mar. 17, 2011, and incorporated herein by reference.

STATEMENT REGARDING FEDERALLY SPONSORED RESEARCH AND DEVELOPMENT

Not Applicable.

FIELD OF THE INVENTION

This invention relates to hunting blinds, and more particularly to a hunting blind removably attachable to a utility trailer frame.

BACKGROUND OF THE INVENTION

Hunting blinds and fishing shelters of the prior art typically need to be transported to a hunting or fishing location and erected. Since often a collapsed hunting blind must be hunting blinds, which are better able to withstand wind and are better insulated, are heavy and bulky to transport. As such, these types of hunting structures are typically set-up on a mobile platform, such as a trailer, with the intent of keeping such structures erected.

Often when hunting it is desirable to have an ATV or other more maneuverable vehicle at hand to retrieve game, arrows, or the like. Further, when traveling back home it is often convenient to have a trailer, luggage rack, or the like upon which to place any game that has been caught. Accordingly, hunting vehicles can quickly become full with such demands on space. Utility trailers are often used to haul an ATV and to support captured game, but such trailers aren't able to contain both a substantial hunting blind structure, ATV or other vehicle, and provide a place for captured game.

Clearly, then, there is a need for a device that can transport a collapsed hunting blind, as well as an ATV or other small vehicle and provide a place for captured game. Such a needed device would provide a platform onto which the hunting blind may be erected, such hunting blind being well insulated and providing a variety of windows and doors for facilitating hunting and fishing. The present invention accomplishes these objectives.

SUMMARY OF THE INVENTION

The present device is a hunting blind for use with a utility trailer of the type that has a frame fixed with at least one pair of wheels. Such a utility trailer typically has a trailer tongue fixed with one side of the frame, and is adapted for towing by a vehicle. In one embodiment, the hunting blind includes the trailer. In another embodiment, the hunting blind is adapted for use with an existing trailer.

The hunting blind includes a rigid rectangular base that comprises two side base members each of which are fixed with a front base member and a rear base member. Each base member is of a different relative height than the others. The base is adapted for removable attachment with the frame of the utility trailer and may further include a floor. The floor may further include at least one hinged and latchable fishing door therein. A front wall is fixed with the front base member with at least one hinge. Likewise, a rear wall is fixed with the rear base member with at least one of the hinges, and two side walls are each fixed with one of the side base members with at least one of the hinges. A plurality of latching mechanisms may be fixed at each side edge of each wall to keep the walls in a deployed position.

A roof may be included and fixable with a top edge of at least two of the walls when the walls are in the deployed configuration. The roof may be a rigid roof, or preferably a flexible canopy that is tied or otherwise mechanically fastened proximate the top edge of at least two of the walls. In such an embodiment, at least one rigid rafter may be included for fixing with the top edge of each side wall, such that the roof may be stretched over the at least one rafter. Preferably each rafter is raised at a center portion thereof so that the roof is raised at the center of the interior space.

In one embodiment, the trailer frame includes at least one pair of upright standoffs fixed thereto, each for supporting a riser in an upright orientation. A cross-beam is supported by the top ends of each riser, which fixedly and selectively holds a platform above the trailer frame and floor panels, as well as above the walls when the walls are in the stacked collapsed configuration. In one embodiment, the platform is a vehicle platform for holding an auxiliary vehicle, such as an ATV. A pair of auxiliary vehicle ramps may be included to provide a ramp for driving the vehicle up to the vehicle platform. Such ramps may then be stowed under the platform and cross-beams. Further, the platform may be a game platform for holding caught game thereon and securing same thereto. Either the vehicle platform, game platform, or both may be included.

In use, with the base fixed with the frame of the utility trailer and with each wall in a substantially vertical orientation, the latching mechanisms may be engaged to fix each wall to its adjacent wall to achieve the deployed position. Thereafter, each latching mechanism may be disengaged so that each wall may pivot downwardly in turn over the trailer, each wall pivoted on its hinges at a different height so that each wall lies substantially horizontally parallel to the other walls in a stacked collapsed configuration for towing.

The present invention provides for a collapsible hunting blind that may be easily towed with a utility trailer, and then easily set-up at any location to which it is towed. The hunting blind is removable from the trailer so that the trailer may be used as a utility trailer when the hunting blind is not in use. The present invention can further transport an ATV or other small vehicle and provides a place for captured game. Other features and advantages of the present invention will become apparent from the following more detailed description, taken in conjunction with the accompanying drawings, which illustrate, by way of example, the principles of the invention.

DESCRIPTION OF THE DRAWINGS

FIG. 1 is a perspective partially cut-away view of one embodiment of the hunting blind of the invention;

FIG. 2 is a diagram showing a rear wall of the hunting blind as being folded down from a deployed configuration;

FIG. 3 is a diagram showing a front wall of the hunting blind as being folded down over the rear wall;

FIG. 4 is a diagram showing a side wall of the hunting blind as being folded down over the front and rear walls;

FIG. 8 is a partial perspective view showing front wall locked with a side wall with a hasp latch device;

FIG. 9 is a perspective view of one embodiment showing a side wall pivotally fixed with a side base member with a hinge, front and opposing side walls omitted for clarity of illustration;

FIG. 10 is a partial perspective view of the hinge of FIG. 9;

FIG. 13 is an exploded partial perspective view of a vertical standoff, riser and cross-beam of one embodiment of the invention; and FIG. 14 is a perspective view of an embodiment that includes a game platform supported above the trailer frame.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Figure 7:
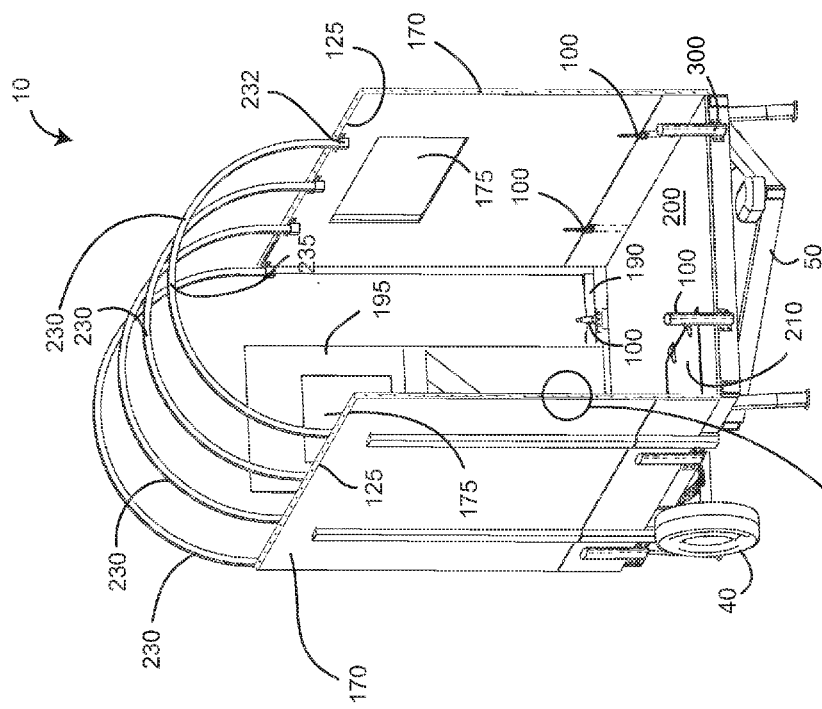
FIG. 7 is a perspective view of the hunting blind in the deployed configuration, the front wall and a front base member removed for clarity of illustration in showing an interior space of the invention.
Figure 11:
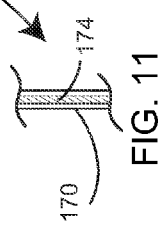
FIG. 11 is an enlarged view of the wall, taken generally along lines 11-11 of FIG. 7.

FIGS. 1 and 7 illustrate a hunting blind 10 for use with a utility trailer 20 of the type that has a frame 30 fixed with at least one pair of wheels 40. Such a utility trailer 20 typically has a trailer tongue 50 fixed with one side 38 of the frame 30, and is adapted for towing by a vehicle (not shown). In one embodiment, the hunting blind 10 includes the trailer 20. In another embodiment, the hunting blind 10 is adapted for use with an existing trailer 20.

The hunting blind 10 includes a rigid rectangular base 60 that comprises two side base members 70 each of which are fixed with a front base member 80 and a rear base member 90. Each base member 70,80,90 is of a different relative height than the others. Each base member 70,80,90 may be made from a suitably rigid material, such as wood, plastic, metal, or the like. In one embodiment, each base member 70,80,90 is made from a rigid or semi-rigid frame having foam 174 or other insulative materials therebetween, both sides thereof being covered by a laminate backer sheet 290. In one embodiment, the backer sheet 290 has a camouflaged pattern printed thereon. A camouflaged skirt 285 may be included for securing around the trailer frame 30, and camouflaged wheel skirts 295 may be fixed over each tire, to further camouflage the hunting blind 10.

The base 60 is adapted for removable attachment with the frame 30 of the utility trailer 20. In one embodiment, illustrated in FIG. 1, at least two of the base members 70,80,90 include at least one vertical post 240 on an outside surface thereof, each vertical post 240 adapted for slidable engagement with a post receiver 250 fixed to the frame 30 of the trailer 20. In an alternate embodiment, each base member 70,80,90 includes the vertical post 240 internally behind the backer sheet 290.

The base 60 may further include a floor 200 fixed between the base members 70,80,90 and comprising one or more substantially flat rigid panels. The floor 200 may further include at least one hinged and latchable fishing door 210 therein, such that access to the ground surface 15 from within the interior space 160 of the hunting blind 10 may be achieved by opening the at least one fishing door 210.

A front wall 180 is fixed with the front base member 180 with at least one hinge 100. Likewise, a rear wall 190 is fixed with the rear base member 90 with at least one of the hinges 100, and two side walls 170 are each fixed with one of the side base members 70 with at least one of the hinges 100. Preferably the rear wall 190 further includes a selectively openable door 195, and preferably at least one window 175 is included in at least one of the walls 170,180.

Each wall 170,180,190 may be made with a suitable rigid sheet material, such as wood, plastic, or metal, and may also be made from a rotational molding process, for example. Each side wall 170 is of a height adapted to counter the different height of each side base member 70, such that when in the vertical orientation 130 the top edges 125 of each side wall are substantially at the same vertical height. Likewise, the front wall 180 and the rear wall 190 are each of a height adapted to counter the different mutual heights of each front base member 80 and rear base member 90, such that when in the vertical orientation 130 the top edges 125 of each front wall 180 and rear wall 190 are substantially at the same vertical height. Each wall 170,180,190 may be made from a rigid or semi-rigid frame or post 240 having foam or other insulative materials therebetween, both sides thereof being covered by the laminate backer sheet 290.

A plurality of latching mechanisms 110, such as standard hasp lock devices 270, may be fixed at each side edge 120 of each wall 170,180,190 to keep the walls 170,180,190 in a deployed position 140 (FIG. 1), thereby defining an interior space 160 therein. At least wall 170,180,190 with a hasp lock 270 (FIG. 1) in order to keep the wall 170,180,190 further fixed in the deployed position 140. Other types of latching mechanisms 110 may be utilized, for example those that lie flush with or even inside the wall 170,180,190 (not shown).

A roof 220 may be included and fixable with a top edge 125 of at least two of the walls 170,180,190 when the walls 170,180,190 are in the deployed configuration 140. The roof 220 may be a rigid roof, or preferably a flexible canopy that is tied or otherwise mechanically fastened proximate the top edge 125 of at least two of the walls 170,180,190. In such an embodiment, at least one rigid rafter 230 may be included for fixing with the top edge 125 of each side wall 170, such that the roof 220 may be stretched over the at least one rafter 230. Preferably each rafter 230 is raised at a center portion 235 thereof, and preferably the front and rear walls 180,190 are likewise raised at a center portion 185,195 thereof. In one embodiment, one rafter 230 is fixed at the top of each of the front wall 180 and the rear wall 190, preferably permanently so. As such the roof 220 when fixed with the top edge 125 of at least two of the walls 170,180,190 is raised at the center of the interior space 160. In one embodiment, a waterfowl window (not shown) may be included in the roof 220 and a top portion of one of the side walls 170.

Figure 12:
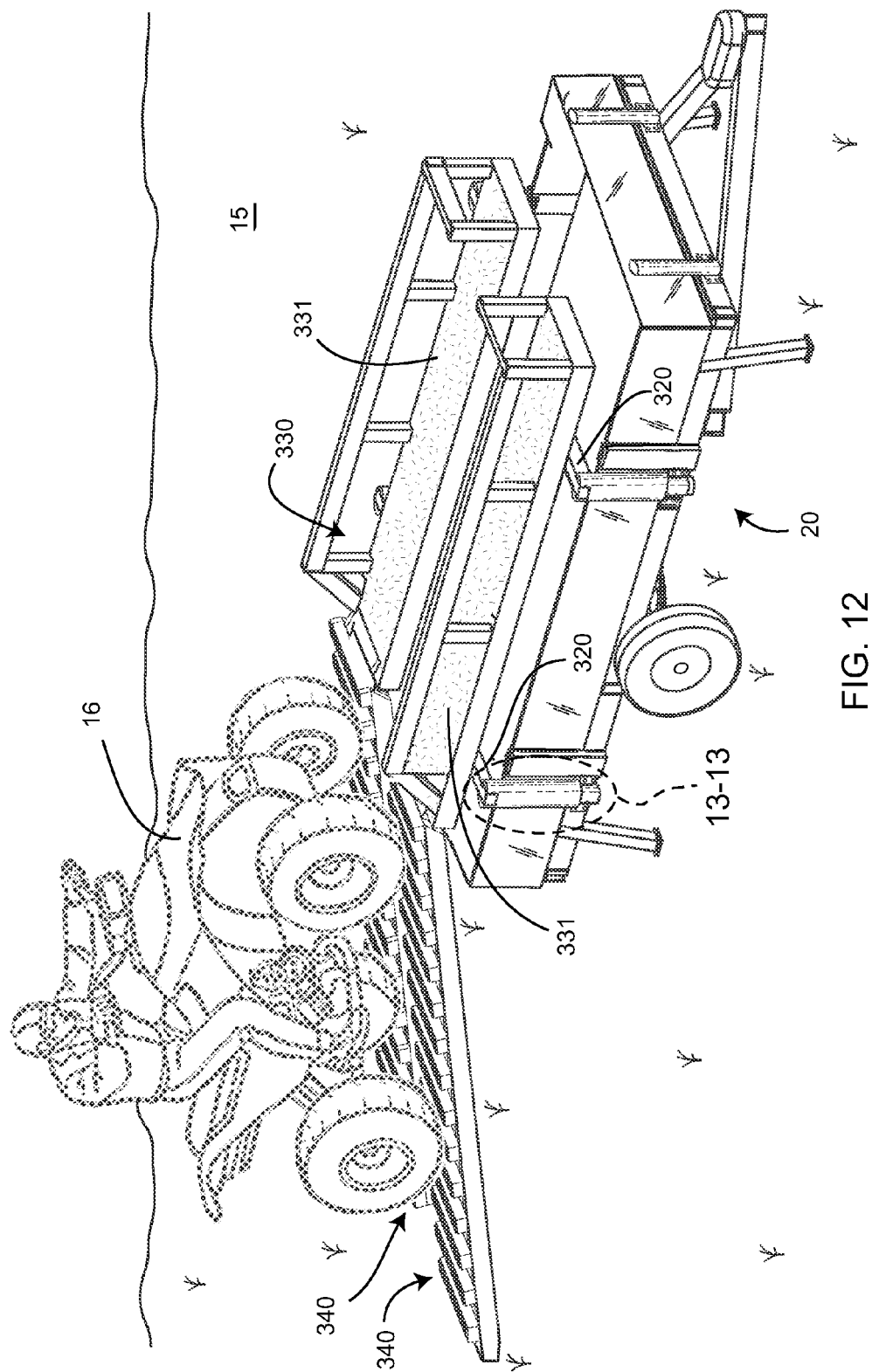
FIG. 12 is a perspective view of the invention in the collapsed configuration, a vehicle platform for supporting an auxiliary vehicle being fixed above the walls and a pair of ramps positioned to allow the auxiliary vehicle to roll up to the vehicle platform from a ground surface.

In one embodiment, the trailer frame 30 includes at least one pair of upright standoffs 300 (FIGS. 12 and 13) fixed thereto. Each standoff 300 is adapted to support a riser 310 which fits around the standoff and is supported thereby in an upright orientation. A cross-beam 320 is supported by the top ends of each riser 310, such as within a groove 315 adapted to hold a portion of each cross-beam 320 proximate the ends thereof with a locking pin 316. The cross-beam 320 fixedly and selectively holds a platform 330 (FIG. 12) above the trailer frame 30 and floor panels 200, as well as above the walls 170,180,190 when the walls 170,180,190 are in the stacked collapsed configuration 150. The platform 330 may be adapted to fit around the cross-beam 320 and to secure thereto with a locking pin 316.

In one embodiment, the platform 330 is a vehicle platform 331 for holding an auxiliary vehicle 16, such as an ATV or other portable, maneuverable vehicle. Such a vehicle platform 331 is adapted to support the tires of such a vehicle 16 and allow for the vehicle 16 to be properly secured thereto. A pair of auxiliary vehicle ramps 340 (FIG. 12) may be included in such an embodiment for placement between the vehicle platform 331 and the ground surface 15 to provide a ramp for driving the vehicle 16 up from the ground surface 15 to the vehicle platform 331. Such ramps 340 may then be stowed under the platform 331 and cross-beams 320, along with the walls 170,180,190. Further, the platform 330 may be a game platform 332 (FIG. 14) for holding caught game (not shown) thereon and securing same thereto. Preferably at least four vertical stand-offs 300 and vertical risers 310 are used to support two of the cross beams 320 for the vehicle platform 331, and at least two vertical stand-offs 300 and vertical risers 310 are used to support one of the cross beams 320 for the game platform 332.

In one embodiment, at least one height-adjustable foot 280 may be pivotally attached to an underside 31 of the trailer frame 30 or trailer tongue 50. As such, if the trailer 20 is decoupled from the towing vehicle (not shown), the at least one foot 280 may be pivoted downwardly to contact the ground surface 15 in order to maintain the frame 30 of the trailer 20 in a substantially horizontal position.

Figure 6:
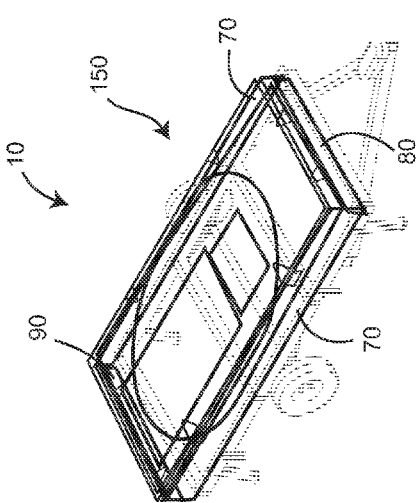
FIG. 6 is a diagram showing the walls of the hunting blind in a collapsed configuration for towing.

In use, with the base 60 fixed with the frame 30 of the utility trailer 20 and with each wall 170,180,190 in a substantially vertical orientation 130 (FIGS. 1 and 7), the latching mechanisms 110 may be engaged to fix each wall 170,180,190 to its adjacent wall 170,180,190 to achieve the deployed position 140. Thereafter, each latching mechanism 110 may be disengaged so that each wall 170,180,190 may pivot downwardly in turn over the trailer 20, each wall 170,180,190 pivoted on its hinges 100 at a different height so that each wall 170,180, 190 lies substantially horizontally parallel to the other walls 170,180,190 in a stacked collapsed configuration 150 (FIG. 6).

Figure 5:
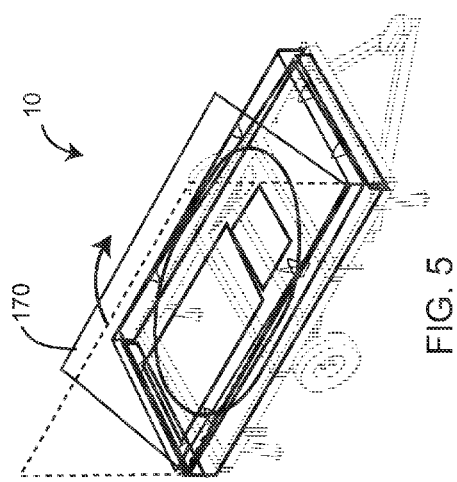
FIG. 5 is a diagram showing another side wall of the hunting blind as being folded down over the other walls.

In one embodiment, for example, the rear wall 190 is associated with the shortest base member 90, so it is lowered first (FIG. 2). The roof 220 and rafters 230 may be positioned on the floor 200 adjacent to the top edge 125 of the rear wall 190 when the rear wall 190 is fully lowered, for example. Next the front wall 180 is lowered (FIG. 3) so that it lies on top of and substantially parallel with the rear wall 190. Each base member 70,80,90 is of a different relative height than the others, the difference being larger than the thickness of the walls 170,180,190, for example, 1.5 inches. Next one of and then finally the last side wall 170 is lowered (FIG. 5) to achieve the collapsed configuration 150 (FIG. 6). The last side wall 170 that is lowered may be locked or otherwise mechanically fastened to the frame 30 of the trailer 20 to keep the walls 170,180,190 in the collapsed configuration 150, such as while the trailer 20 is being towed.

While a particular form of the invention has been illustrated and described, it will be apparent that various modifications can be made without departing from the spirit and scope of the invention. For example, the shape of the front and rear walls 180,190 may be altered, as well as the location of the door 195 and windows 175, and the shape or type of the roof 220. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention. The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A hunting blind for use with a utility trailer resting on a ground surface, the utility trailer of the type having a frame fixed with at least one pair of wheels, and a trailer tongue fixed with one side of the frame, the hunting blind comprising:
   a rectangular base comprising two side base members each fixed with a front base member and a rear base member, each member being of a different relative height, the base adapted for removable attachment with the frame of the utility trailer;
   a front wall fixed with the front base member with at least one hinge;
   a rear wall fixed with the rear base member with at least one hinge;
   two side walls each fixed with one of the side base members with at least one hinge;
   a plurality of latching mechanisms fixed with side edges of each wall;
   whereby with the base fixed with the frame of the trailer and each wall in a substantially vertical orientation, the latching mechanisms are engaged to fix each wall to its adjacent walls to keep the walls in a deployed position and to define an interior space therein, thereafter each latching mechanism being disengageable so that each wall is pivoted downwardly over the trailer, each wall pivoted at its hinges at a different height so that each wall lies substantially horizontally parallel to the other walls in a stacked collapsed configuration.

2. The hunting blind of claim 1 wherein the base further includes a floor having at least one hinged and latchable fishing door therein, such that access to the ground surface from within the interior space is achieved by opening the at least one fishing door.

3. The hunting blind of claim 1 further including a flexible roof fixable with a top edge of at least two of the walls when the walls are in the deployed configuration.

4. The hunting blind of claim 3 further including at least one rafter adapted for fixing with the top edge of each side wall.

5. The hunting blind of claim 3 wherein each rafter is raised at a center portion thereof, and wherein the front and rear walls are raised at a center portion thereof, such that the roof when fixed with the top edge of at least two of the walls is raised with respect to the top edge of each of the walls at the center of the interior space.

6. The hunting blind of claim 1 wherein at least two of the base members include a vertical post on an outside surface thereof, each vertical post adapted for slidable engagement with a post receiver fixed to the frame of the trailer.

7. The hunting blind of claim 1 wherein the latching mechanisms are each hasp lock devices.

8. The hunting blind of claim 1 wherein at least one of the walls is selectively fixed with the base member to which it is hingeably attached with a hasp lock device to keep the wall fixed in the deployed position.

9. The hunting blind of claim 1 further including at least one height-adjustable foot pivotally attached to an underside of the trailer frame, whereby the trailer is decoupled from a towing vehicle with the at least one foot pivoted downwardly to maintain the frame of the trailer in a substantially horizontal position.

10. A hunting blind comprising:
    a utility trailer having a frame fixed with at least one pair of wheels, and a trailer tongue fixed with one side of the frame;
    a rectangular base comprising two side base members each fixed with a front base member and a rear base member, each member being of a different relative height, the base adapted for removable attachment with the frame of the utility trailer;
    a front wall fixed with the front base member with at least one hinge;
    a rear wall fixed with the rear base member with at least one hinge;
    two side walls each fixed with one of the side base members with at least one hinge;
    a plurality of latching mechanisms fixed with side edges of each wall;
    whereby with the base fixed with the frame of the trailer and each wall in a substantially vertical orientation, the latching mechanisms are engaged to fix each wall to its adjacent walls to keep the walls in a deployed position and to define an interior space therein, thereafter each latching mechanism being disengageable so that each wall is pivoted downwardly over the trailer, each wall pivoted at its hinges at a different height so that each wall lies substantially horizontally parallel to the other walls in a stacked collapsed configuration, the base and walls removable from the trailer such that the trailer is otherwise usable as a utility trailer.

11. The hunting blind of claim 10 wherein the base further includes a floor having at least one hinged and latchable fishing door therein, such that access to the ground surface from within the interior space is achieved by opening the at least one fishing door.

12. The hunting blind of claim 10 further including a flexible roof fixable with a top edge of at least two of the walls when the walls are in the deployed configuration.

13. The hunting blind of claim 12 further including at least one rafter adapted for fixing with the top edge of each side wall.

14. The hunting blind of claim 12 wherein each rafter is raised at a center portion thereof, and wherein the front and rear walls are raised at a center portion thereof, such that the roof when fixed with the top edge of at least two of the walls is raised in the center of the interior space.

15. The hunting blind of claim 10 wherein at least two of the base members include a vertical post on an outside surface thereof, each vertical post adapted for slidable engagement with a post receiver fixed to the frame of the trailer.

16. The hunting blind of claim 10 wherein the latching mechanisms are each hasp lock devices.

17. The hunting blind of claim 10 wherein at least one of the walls is selectively fixed with the base member to which it is hingeably attached with a hasp lock device to keep the wall fixed in the deployed position.

18. The hunting blind of claim 10 further including at least one height-adjustable foot pivotally attached to an underside of the trailer frame, whereby the trailer is decoupled from a towing vehicle with the at least one foot pivoted downwardly to maintain the frame of the trailer in a substantially horizontal position.

19. The hunting blind of claim 10 wherein the trailer frame further includes at least one pair of upright standoffs fixed thereto, each pair of standoffs adapted to support a riser and a cross-beam removably fixed between each riser, the cross-beam for fixedly holding a platform above the trailer frame and walls when the walls of the hunting blind are in the stacked collapsed configuration.

20. The hunting blind of claim 19 wherein the platform is a vehicle platform adapted to support an auxiliary vehicle.

21. The hunting blind of claim 20 further including a pair of auxiliary vehicle ramps adapted for placement between the vehicle platform and the ground surface.

22. The hunting blind of claim 19 wherein the platform is a game platform adapted to support caught game.

* * * * *